March 31, 1964  J. E. TIEMAN  3,126,687
METHOD FOR SALVAGING WASTE COTTON
Original Filed April 19, 1961  3 Sheets-Sheet 1

*INVENTOR.*
JAMES E. TIEMAN
BY
Garvey & Garvey
ATTORNEYS

March 31, 1964  J. E. TIEMAN  3,126,687
METHOD FOR SALVAGING WASTE COTTON
Original Filed April 19, 1961  3 Sheets-Sheet 2
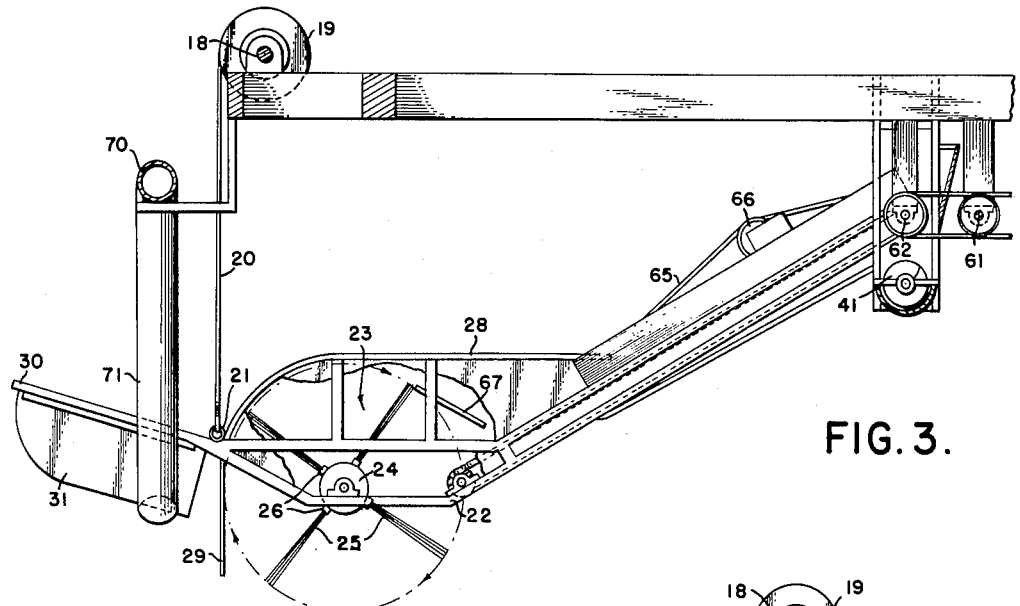
FIG. 3.
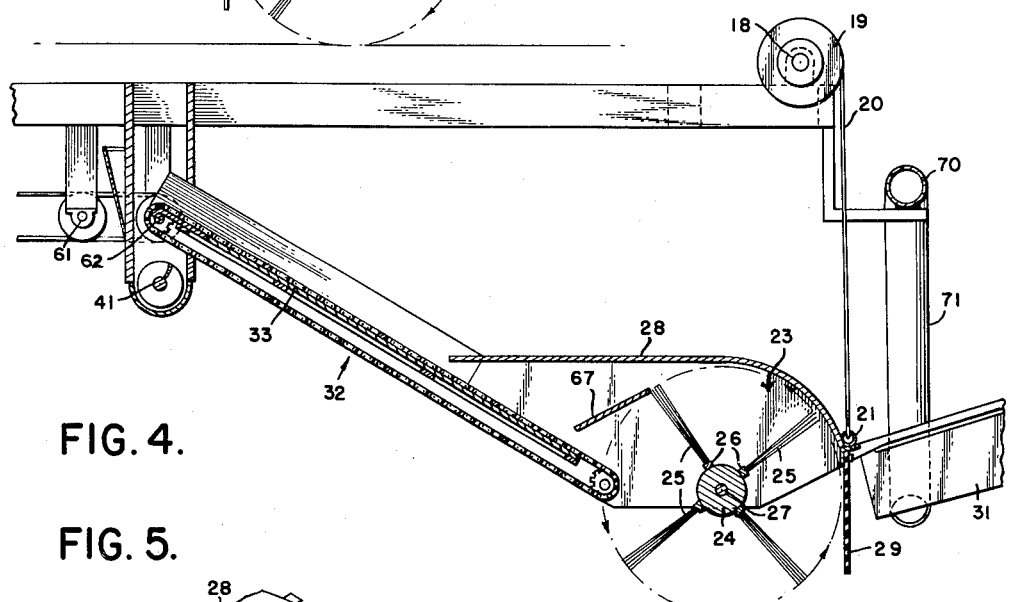
FIG. 4.
FIG. 5.
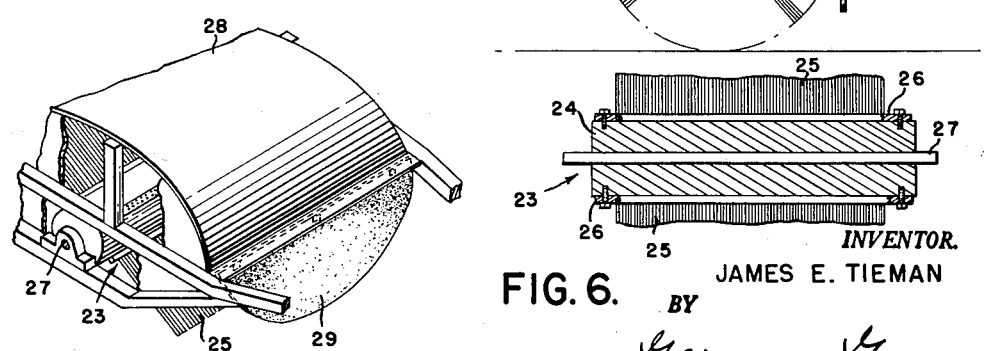
FIG. 6.
INVENTOR.
JAMES E. TIEMAN
BY
*Garvey & Garvey*
ATTORNEYS March 31, 1964    J. E. TIEMAN    3,126,687
METHOD FOR SALVAGING WASTE COTTON
Original Filed April 19, 1961    3 Sheets-Sheet 3
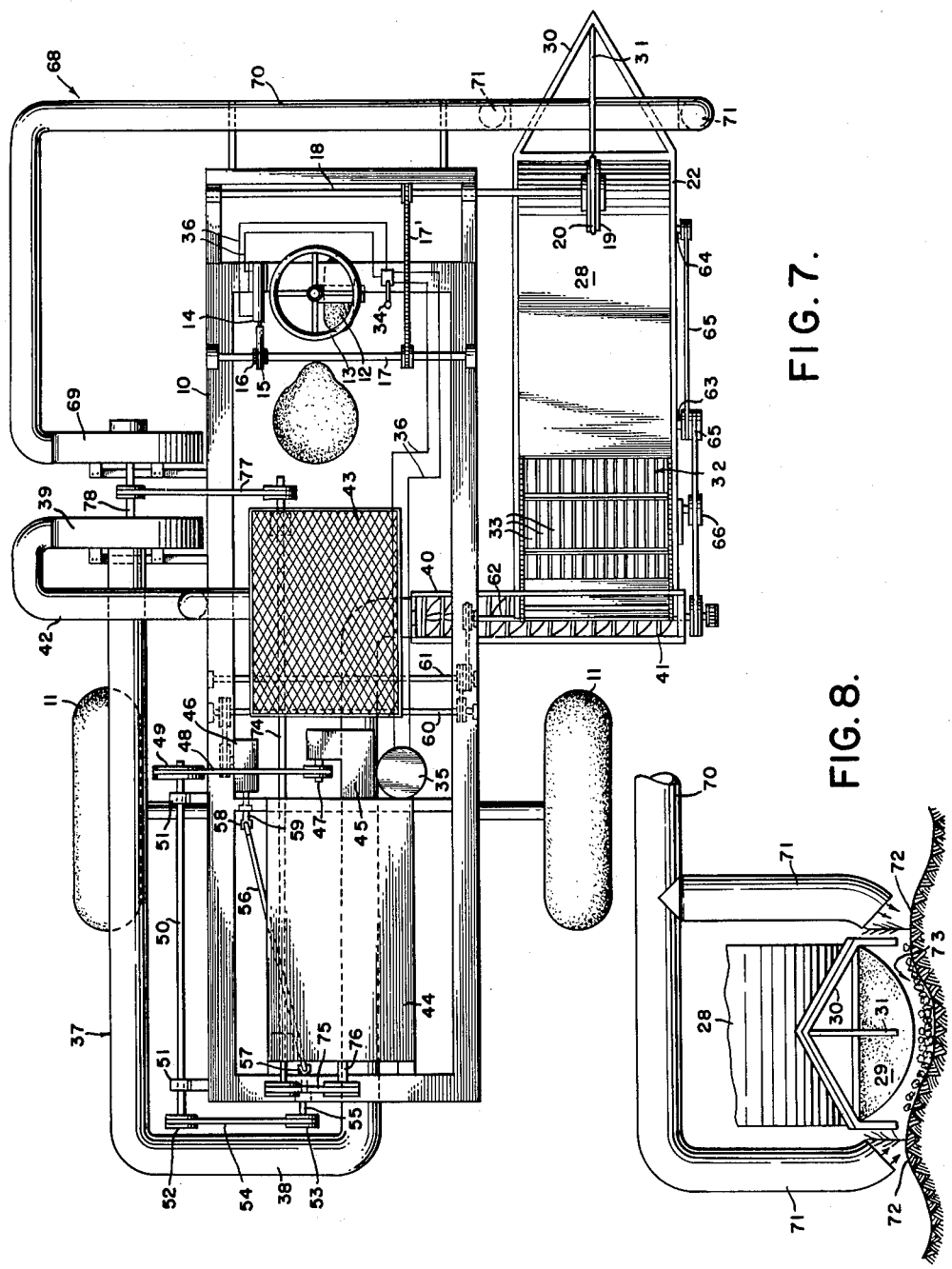
INVENTOR.
JAMES E. TIEMAN
BY
Garvey & Garvey
ATTORNEYS

United States Patent Office 3,126,687
Patented Mar. 31, 1964

3,126,687
METHOD FOR SALVAGING WASTE COTTON
James E. Tieman, 548 S. Horne St., Mesa, Ariz.
Original application Apr. 19, 1961, Ser. No. 104,126, now Patent No. 3,092,948, dated June 11, 1963. Divided and this application Nov. 8, 1962, Ser. No. 236,371
6 Claims. (Cl. 56—1)

The present invention is a method for salvaging cotton that remains on the ground after harvesting and is an improvement on my Patent Number 2,938,321, patented May 31, 1960, and a division of my pending application, Serial Number 104,126, filed April 19, 1961, now Patent No. 3,092,948, issued June 11, 1963.

An object of the invention is to provide a method of salvaging waste cotton from a plurality of cotton rows by simultaneously moving the cotton from the rows to a point of vantage, adjacent the rows, from which point the salvaged cotton is picked up, all of which is done in a single pass of the cotton moving means and the cotton pick up means, through the cotton field.

A further object of the invention is to mechanically move salvaged cotton from a pair of cotton rows into a furrow between the rows, the cotton being picked up from the furrow by mechanical means.

Still another object of the invention is to provide a method which experiments have shown will salvage approximately two hundred and fifty (250) pounds of cotton per one-half mile of cotton field traveled, the salvaged cotton being blown to a vantage point from which it is picked up by mechanical means.

Other objects of the invention will be manifest from the following description of the present preferred form of the invention, taken in connection with the accompanying drawings wherein:

FIG. 3 is a longitudinal sectional view, taken on line 3—3 of FIG. 2, looking in the direction of the arrows;

FIG. 4 is a longitudinal sectional view taken on the line 4—4 of FIG. 2, looking in the direction of the arrows;

FIG. 5 is a detailed fragmentary perspective view of the improved cotton salvaging assembly, showing the manner of mounting the cotton picker and illustrating the proximity of the pendent shield to the picker brushes;

FIG. 6 is a central longitudinal sectional view through the picker cylinder, showing the fingers fragmentarily;

FIG. 7 is a plan view, illustrating a conventional self-propelled cotton picker, with the superstructure removed, and incorporating my improved cotton salvaging apparatus; and FIG. 8 is a front elevational view of the cotton salvage assembly illustrating its application and also illustrating the position of the outlet terminals of the blower parts thereto and the cotton field.

Figure 1:
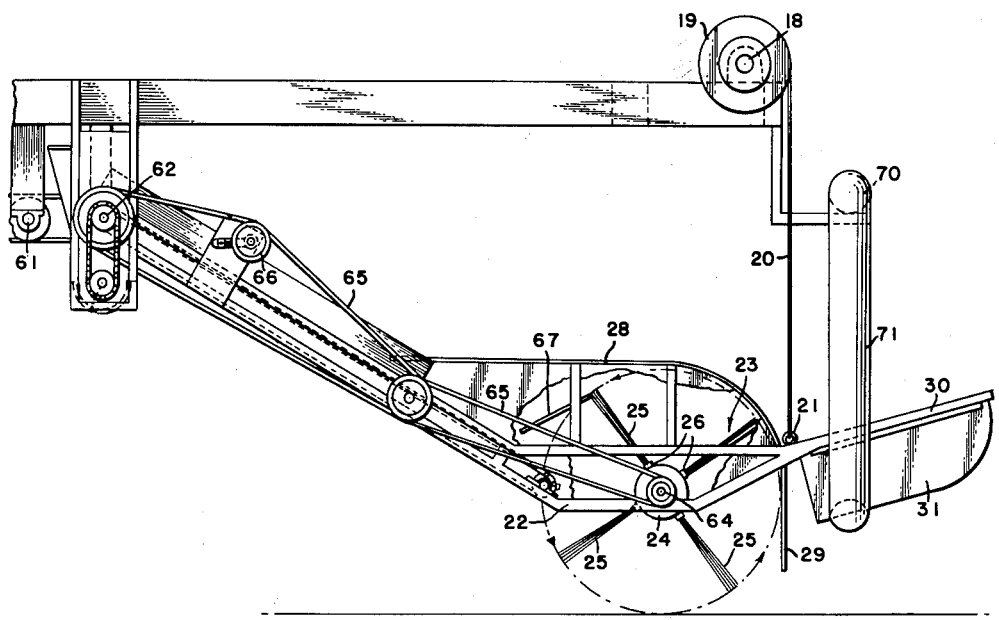
FIG. 1 is a fragmentary side elevational view of the apparatus used in carrying out the method of the present invention, showing the abutment plate elevated.

In order to illustrate the application of this invention, I have shown in plan, the essential parts of a Rust Self-Propelled Cotton Picker with its superstructure removed. The picker includes a frame or chassis 10 equipped with parallel rear wheels 11 and a fore wheel 12. The wheel 12 is dirigible and in operative connection with a steering wheel 13. A hydraulic hoist means for the fore part of the salvage assembly is mounted at the front of the frame and on top of the latter, as illustrated in FIG. 7. The hoist means comprises a cylinder 14 including a movable part 15 which may be a rack bar or the like engaged with a complemental gear 16 on a shaft 17, the opposite ends of said shaft being journaled on opposite sides of the frame. The shaft 17, through the medium of a sprocket chain 17', is in operative engagement with an elongated shaft 18. One end of the shaft 18 is journaled in one side of the frame 10, the opposite end being extended through a bearing on the opposite side of the frame and extending appreciably therebeyond. The free terminal of the shaft 18 carries an enlarged pulley 19, to which is secured one end of a cable 20.

Figure 2:
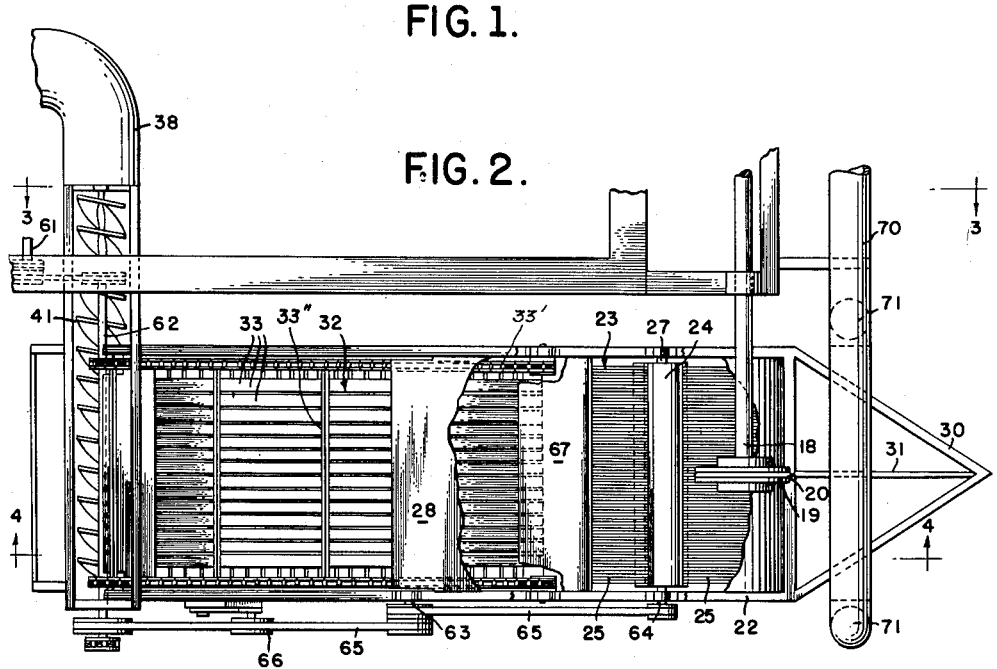
FIG. 2 is a top plan view of the same, with parts removed to disclose details.

The salvaging assembly of this invention includes generally a sub-frame attached to and incorporated in the Rust cotton picker entity; a cotton pick up, for waste cotton, in the frame; an elevator for the salvaged cotton to transport the latter up to the pneumatic transfer of the cotton picker; and a blower in circuit with said pneumatic transfer to simultaneously force the waste cotton from two adjacent harvested rows, into the furrow between said rows, preparatory to travel of the cotton pick up part of the assembly, over said furrow. This assembly, shown in detail in FIGS. 1, 2, 3 and 4, includes the sub-frame 22 and the salvage cotton pick up generally designated 23. The cotton pick up comprises a cylinder or spindle 24 which has radiating therefrom, at intervals, elongated picker fingers 25 which are preferably made of a combination of nylon and wire and are secured to the periphery of the cylinder by suitable means 26. The cylinder is rotatably mounted on an axle 27, the opposite ends of the latter being journaled in the opposite sides of the sub-frame 22, as shown to advantage in FIG. 2. A casing 28 is carried by the sub-frame 22 and is arched over the top of the picker 23 and extends aft of the latter as shown in FIGS. 1 and 2. An I bolt 21 is secured to the sub-frame 22, engageable with one end of cable 20.

The salvaging assembly additionally includes a flexible pendent intercepter sheet or shield 29, which hangs from the sub-frame 22, being attached to the casing 28 after the fashion shown in FIG. 4. The sheet 29 may be made of rubber or other flexible material and when in normal use, its lower margin is in proximity to, but appreciably spaced from the cotton field. The forward end of the sub-frame 22 issues into a V terminal 30, which supports an abutment plate 31, said plate being positioned approximately midway between the parallel sides of the sub-frame 22.

The salvage assembly still further includes an elevator or conveyor assembly, generally designated 32, which comprises a slatted or grated floor 33, sprocket chains 33' and pusher bars 33", the ends of the bars being secured to the chains. The bars extend at intervals, transversely across the floor 33. The elevator or conveyor assembly is disposed at an inclination, as shown to advantage in FIGS. 1, 3 and 4, to permit twigs and other extraneous materials to drop in the spaces between the slats, as the cotton is pushed up the floor. The salvaged cotton, from the pick up 23, is conveyed to its point of discharge, at the top of the conveyor. The pick up 23 and the conveyor chains 33' are operated by common means hereinafter referred to.

The hoist means, including the movable part 15, may be placed in operation by valve operator 34, which controls movement of part 15 through feed and return lines 36, which issue from the fluid supply receptacle 35.

A conventional pneumatic system, generally designated 37, is included in the cotton picker, here illustrated in part, and includes a suction conduit 38, one end of which is in communication with a fan 39, and the opposite end in communication with a cotton feed auger unit 40. The unit 40 is in communication with the top of the elevator or conveyor assembly 32, so that the salvaged cotton, carried upwardly on the elevator, will be permitted to drop into the unit 40, where it is intercepted and conveyed by the auger 41 of said unit to the conduit 38, as advantageously illustrated in FIGS. 2 and 7. The cotton is then circuited through auxiliary conduits 42 into a conventional basket 43 supported on the frame 10 in any suitable manner.

The power plant of the harvester is indicated at 44 and includes a main gear box 45 and an auxiliary gear box 46. The main gear box has a drive shaft 47 extending therefrom which carries a pulley with a belt 48 trained thereon. The same belt is likewise trained over a pulley 49 mounted on one end of a driven shaft 50, the driven shaft being rotatably mounted in bearings 51 which project laterally from one side of the frame 10 as illustrated in FIG. 7. The opposite terminal of the driven shaft 50 to that which carries the pulley 49, has a pulley 52 mounted thereon, which is in operative connection with a pulley 53, through a belt 54. Pulley 53 is carried on a stub shaft 55 which projects outwardly from the aft end of the frame 10, the forward end of said shaft being engaged with one end by a shaft 56 through a universal coupling 57, the opposite end of the shaft 56 being engaged by a universal coupling 58 to a shaft 59, which extends into the gear housing 46. The shafts 56 and 59 impart movement to the gears of the housing 46 in a manner well known in the art, so as to, in turn, rotate a shaft 60 through suitable pulleys and belting to accomplish rotation of shaft 61 also through suitable pulleys and belting, in order to impart movement to a shaft 62 which extends above the feed auger 41 by the belting and pulley arrangement illustrated in FIG. 7. The shaft 62 extends beyond one end of the unit 40 and is in operative connection with shaft 63, for effecting operation of the elevator or conveyor assembly 32. The end of shaft 62 is also in operative communication with the extended end 64 of the axle 27. The shafts 62, 63 and 64 are in communication with conventional pulley and belting, generally designated 65, idler pulley 66 being engaged with one of the belts as shown to advantage in FIG. 1 for purposes well known in the art.

It now becomes apparent that as the harvester, with cotton salvage assembly, is moved over the cotton field, the cotton in the furrow traversed by the pick up is swept upwardly, by the counter-clockwise movement of the pick up, the cotton being deposited on an adjustable ramp 67, which is normally disposed at an inclination, and terminates in proximity to the upper run of the elevator or conveyor. The cotton moves on the slatted floor of the conveyor assembly, to the top of the latter, where it is unloaded as heretofore described, into the unit 40, preparatory to being pneumatically transferred to the basket 43.

The pneumatic system 37 also includes a blower section generally designated 68 which comprises a blower 69, conduit 70, and outlet adapters 71. The lower terminals of the latter are preferably bent inwardly as shown in FIG. 8 and normally lie in close proximity to a pair of cotton rows, so that the air passing through said adapters will blow cotton from the rows 72 and the harvested plants, into the furrow 73, as also shown in FIG. 8. The cotton will be blown against the abutment plate 31 along the longitudinal center of the furrow and will be prevented from entering into the rotary path of movement of the pick up 23, by reason of the flexible intercepter sheet 29, which insures retention of the salvaged cotton on the ground where it will be engaged by the fingers of the pick up 23.

The fan 39 and blower 69 are operated from a common power source, which is an elongated shaft 74 which extends from the aft end of the frame 10 forwardly to a point well in advance of the midway portion of the frame 10. Said aft end of the shaft 74 is in operative connection with the power plant 44 through belt and pulley arrangement 75 engaged with power shaft 76 extending from the power plant 44. The forward terminal of the shaft 74 is in operative connection with the fan 39 and blower 69 through a pulley and belt assembly 77 which, in turn, engage a driven shaft 78, the opposite ends of which are in operative connection with the fan and blower in a conventional manner. The air is blown from the fan through the conduit 70 outwardly through the adapters 71, as heretofore described.

Although I have here shown a preferred embodiment of a cotton salvage machine constructed to carry out the method of the present invention, having special adaptation for operation on and with a standard type of cotton picker, it is nevertheless to be understood that various changes may be made herein, within the scope of the appended claims.

What is claimed is:

1. A method of salvaging waste cotton comprising blowing cotton from a pair of harvested cotton rows into the furrow between said rows after which the cotton is mechanically picked from said furrow.

2. The method of claim 1 wherein the blown cotton is caused to gravitate into the furrow and prevented from entering the cotton blowing means.

3. A method of salvaging waste cotton comprising moving waste cotton from a pair of harvested cotton rows to a point intermediate said rows, after which the cotton is picked up from said point between the rows.

4. The method of claim 3 in which the waste cotton is mechanically moved from the cotton rows.

5. The method of claim 4 in which the waste cotton is mechanically picked up from between said rows.

6. A method of salvaging waste cotton, from a plurality of cotton rows comprising simultaneously moving waste cotton from said rows, to a point of vantage adjacent the rows, to permit pick up of the cotton from said vantage point, in a single pass of the cotton moving means and cotton pick up means through the cotton field.

No references cited.